United States Patent [19]
Whitehead et al.

[11] Patent Number: 5,598,298
[45] Date of Patent: Jan. 28, 1997

[54] POLARIZATION PERCEPTION DEVICE

[75] Inventors: Victor S. Whitehead, Seabrook, Tex.; Kinsell L. Coulson, Vacaville, Calif.

[73] Assignee: The United States of America as represented by the Administrator of the National Aeronautics and Space Administration, Washington, D.C.

[21] Appl. No.: 374,452

[22] Filed: Jan. 18, 1995

Related U.S. Application Data

[62] Division of Ser. No. 863,883, Apr. 6, 1992, abandoned.

[51] Int. Cl.$^6$ .................................................... G02B 5/30
[52] U.S. Cl. ............................ 359/485; 359/490; 359/501; 356/364
[58] Field of Search ........................... 359/483, 485, 359/490, 501; 356/364; 354/126

[56] References Cited

U.S. PATENT DOCUMENTS

| | | | |
|---|---|---|---|
| 2,217,718 | 10/1940 | Ulano | 359/501 |
| 2,383,186 | 8/1945 | Glasser | 359/501 |
| 2,825,271 | 3/1958 | McKae | 359/501 |
| 3,062,087 | 11/1962 | Zandman et al. | 359/501 |
| 3,368,652 | 2/1968 | Klatchko | 359/501 |
| 3,804,522 | 4/1974 | Smith | 359/501 |
| 5,264,916 | 11/1993 | Bushman | 356/364 |
| 5,345,308 | 9/1994 | Bushman | 359/501 |

*Primary Examiner*—Ricky D. Shafer
*Attorney, Agent, or Firm*—James M. Cate

[57] ABSTRACT

A polarization perception device comprises a base and a polarizing filter having opposite broad sides and a centerline perpendicular thereto. The filter is mounted on the base for relative rotation and with a major portion of the area of the filter substantially unobstructed on either side. A motor on the base automatically moves the filter angularly about its centerline at a speed slow enough to permit changes in light transmission by virtue of such movement to be perceived as light-dark pulses by a human observer, but fast enough so that the light phase of each such pulse occurs prior to fading of the light phase image of the preceding pulse from the observer's retina. In addition to an observer viewing a scene in real time through the filter while it is so angularly moved, or instead of such observation, the scene can be photographed, filmed or taped by a camera whose lens is positioned behind the filter.

4 Claims, 2 Drawing Sheets

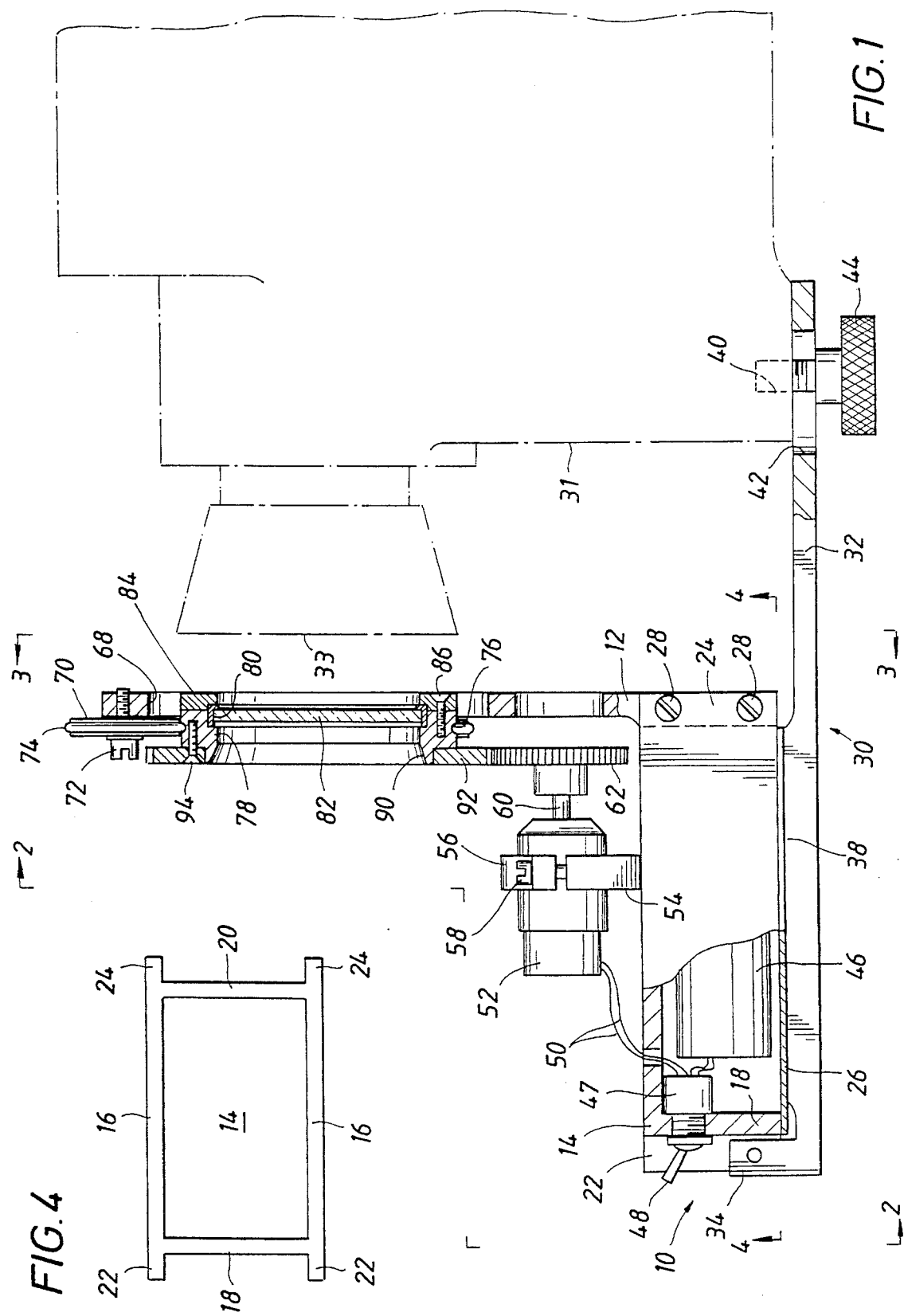

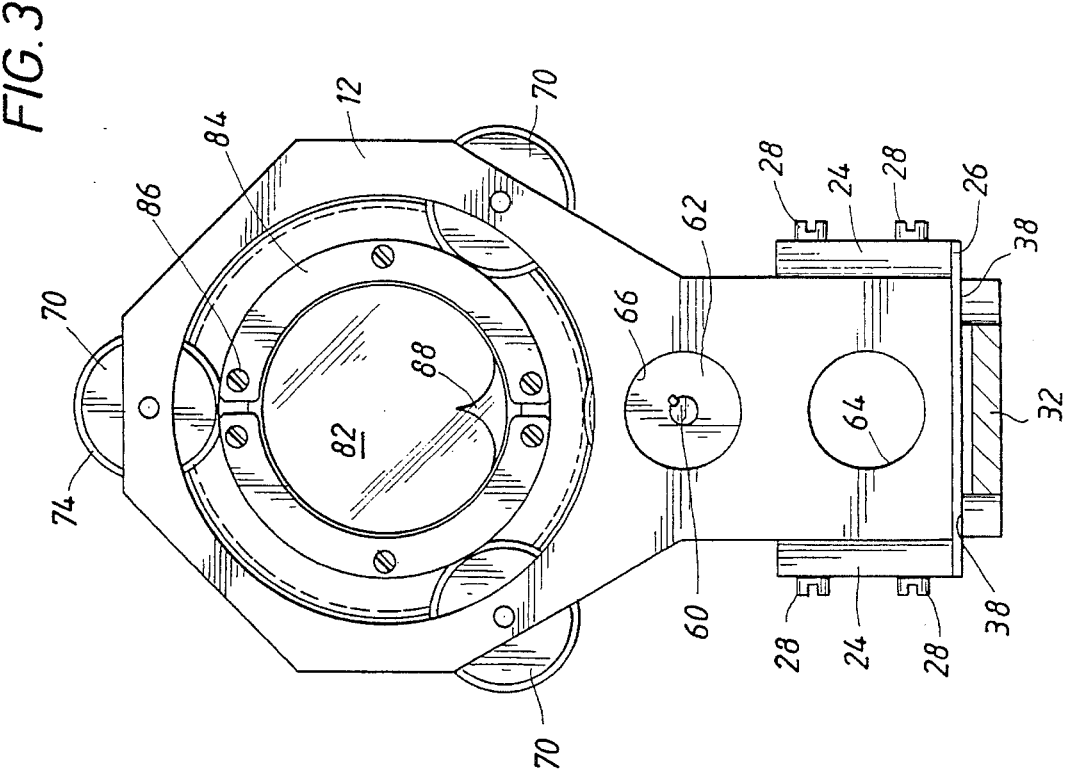
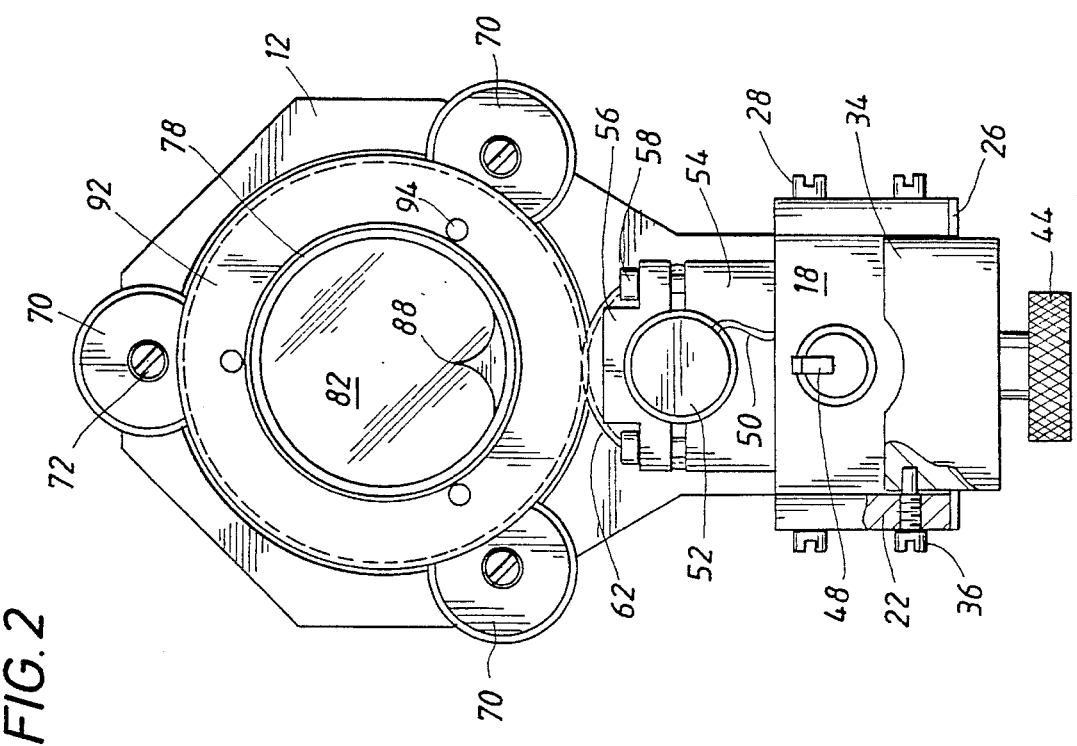

POLARIZATION PERCEPTION DEVICE

ORIGIN OF THE INVENTION

The invention described herein was made by an employee of the United States Government and another, and may be manufactured and used by or for the Government of the United States of America for governmental purposes without the payment of any royalties thereon or therefor.

This is a division of Ser. No. 07/863,883, filed Apr. 6, 1992, abandoned.

BACKGROUND OF THE INVENTION

The present invention deals with the problem of making polarization of light more readily perceptible by a human viewer, either in real time, or in viewing photographic images, such as video tape, film, or even still photographs.

Natural sunlight is not polarized. Thus, if one considers a given plane or planar field of view, and recognizes that light is propagated in waves, each wave following a line or axis traversing that planar field, then there will be as much natural sunlight generated in waves parallel to a first line as there is light generated in waves running perpendicular to that line.

Other sources of light, most notably indirect sources such as various surfaces which are reflecting natural sunlight, polarize the light to greater or lesser extents, and in different ways. This means that it is possible, considering the same planar field of view, to find a direction traversing that plane in which a maximum amount of the light reflected by such a source is generated, and it will be found that a minimum of the light reflected by that source is generated in a direction perpendicular thereto.

Information about the relative degrees and manners of light polarization, as among various objects in a scene, can potentially give much useful information about those objects. For example, if viewing the scene of an offshore oil spill from the air, it might not be possible to determine visually the exact location of the perimeter of an oil slick on water. However, if one could evaluate the polarization of light reflected from the various portions of the body of water being viewed, the size, location and shape of the slick could be more precisely determined, and this would be very useful in directing clean up efforts.

However, it is, as mentioned, virtually impossible for at least the majority of human beings to visually perceive polarization phenomena with the naked eye.

DESCRIPTION OF THE PRIOR ART

Polarization filters have long been known. Holding such a filter in one's hand, and interposing it between the eyes and the scene being viewed, it is sometimes possible, by rotating the filter manually, to notice the amount of light being reflected from certain surfaces in the scene being greater or lesser when the filter is in respective perpendicular positions, while the light reflected from other objects seems not to change appreciably. This allows a person to at least perceive the fact that some objects polarize light more so, or differently, than others. However, because of the relatively short duration of one's visual memory, i.e. the time it takes for an image to fade from the retina, it would be virtually impossible, by this method, to make an accurate analysis of the amounts and manners of polarization of light by all objects in a scene. Furthermore, it requires undue time and experimentation; one cannot know, at the outset, what angular position of the filter will maximize the reflectivity of the polarizing surfaces, so that that position of the filter can be used as a starting point from which to compare a perpendicular position.

Nevertheless, utilizing this general principle, experiments have been tried in which two cameras view the same scene, each through its own respective polarizing filter, but with one filter rotated 90° with respect to the other. Later, the video tapes, films, or photos from the two cameras could be compared to analyze the polarization phenomena of the objects in the scene. However, this approach still suffers from the problem that the positions of the filters may not be such as to, respectively, maximize and minimize the apparent reflection of light from a given object, and it might be necessary, in order to attempt to do so, to turn the cameras this way and that, taking multiple shots, in an effort to come up with at least some pairs of tapes or photos which will best show the differences. Furthermore, such a system does not provide any way for a human viewer to perceive the polarization phenomena in a scene being taped or photographed in real time, i.e. while the tapes or photographs are being shot.

A number of prior patents disclose devices for analyzing polarization phenomena. However, none of them solve the problem of allowing a human observer to readily observe differences in the polarization effects of different objects in a scene in real time.

U.S. Pat. No. 2,412,074 to Binford discloses a device for testing a polarizing element such as a polarizing filter. The filter to be tested is mounted in a frame where it is aligned with other known or standard polarizing filters and a light source. The portion of the frame in which the filter to be tested is mounted is manually rotatable so that the orientation of the test filter with respect to the standard filters can be varied. This device is not adapted for mounting on a camera and/or viewing of a scene through a filter by a human observer. Even if it were attempted to modify the device for that purpose, it would be beset with many of the problems described above in connection with efforts to manually rotate a filter, in terms of actual human perception ability.

U.S. Pat. No. 3,631,254 to Covault includes an automatically rotatable "chopper" interposed between a series of polarizing filters and a target. In association with a fairly complicated electrical and optical system, a total scene "image" is eventually produced, but not in such manner as to be visible in real time by a human observer. The apparatus generates an A/C signal, from which the scene image is extrapolated or developed, not an actual visual or photographic image.

U.S. Pat. No. 4,653,924 to Etonaga et al likewise discloses an analytical type device, which includes a rotating member, but which member is not a polarizing filter. Again, the device is not adapted for real time human viewing nor photographic scene image making.

U.S. Pat. Nos. 4,671,660, 1,959,549, and also 3,545,865 disclose various types of meter-like instruments, none of which produce a complete scene image, much less one which can be photographically reproduced or viewed by a human in real time.

SUMMARY OF THE INVENTION

The present invention provides a means and method whereby a human observer can visually perceive the relative polarization phenomena of various objects in a given scene in real time, and/or delayed time if the scene is filmed, taped or photographed. The invention is based on the discovery that, if a polarization filter in the line of vision of the observer (and/or the camera lens) is moved angularly, i.e. rotated or oscillated, about its own centerline and at a speed within an optimum range, the different reflective phenomena of objects in the scene which polarize light to different extents, and which can be observed when the filter is at maximum and minimum positions 90° from one another, can be perceived as pulses. With proper timing, i.e. a sufficiently fast speed of angular movement, the light phase of each pulse will occur prior to the time that the image of the immediately preceding light phase fades from the retinas of the observer's eyes. In other words, the speed is coordinated with the visual sensory memory so that the precise location and shape of each object so polarizing the light can be perceived in a manner which is effectively continuous from the observer's point of view. However, it is important that the filter not move too fast, in which case the flashing or pulsing effect is no longer discernible.

To take advantage of this discovery, the invention provides a polarization perception device which includes a base structure. A polarizing filter having opposite broad sides and a centerline perpendicular to those sides is mounted on the base structure for relative rotation with respect thereto. The shape of the base structure, and its means of mounting the filter, is such that a major portion of the area of the filter is substantially unobstructed on either side. Automatic drive means carried by the base structure are operatively connected to the filter and adapted to move the filter angularly about its centerline at a speed slow enough to permit changes in light transmission by virtue of that angular movement to be perceived as light-dark pulses by a human observer, but fast enough so that the light phase of each pulse occurs prior to fading of the light phase image of the preceding pulse from the observer's retina.

In a preferred embodiment, the precise manner of movement of the filter is continuous rotation in a constant direction, e.g. clockwise, and preferably at a speed between one revolution per five seconds and one revolution per one-fifteenth second, inclusive. In a current exemplary embodiment prototype, a speed of one revolution per second has been found to work well for both real time human observation and video taping.

In addition to allowing a human observer to perceive the polarization phenomena in a given scene in real time or delayed time, where the scene is recorded, i.e. video taped, filmed or photographed in a succession of still shots, the results can be analyzed and quantified, e.g. by known digitization technology. To assist in such analysis and quantification, and perhaps also in the limited analysis which may occur when a human observer is viewing the scene, it is desirable that there be a visible angular position indicator projecting into an otherwise unobstructed field of view of the filter and mounted to rotate or otherwise move angularly jointly with the filter. Thus, the instantaneous orientation of the filter with respect to any given film or tape image can always be determined.

This indicator may be in the form of a pointer or the like on the filter itself, its frame, or an annular carrier which receives the filter and is rotatably mounted on the base structure and operably connected to the drive means for rotation thereby.

The base structure may have an upright portion having a through opening and mounting a plurality of idler rollers circumferentially spaced about that opening. The annular carrier for the filter can then be centered within the idler rollers and supported thereby in alignment with the through opening. A first gear may be formed on or connected to the carrier so that it projects radially outwardly therefrom, and a second gear, meshing with the first gear, may be connected to the drive means, e.g. an electric motor, for rotation thereby. The base structure may also comprise a horizontal portion mounting that motor and also providing a battery case for batteries operatively connected to the motor. The base may also carry an on-off switch.

A connector may be carried by the base structure and adapted to connect the base structure to a camera with the filter aligned with the camera lens. The filter may also be removably mounted in the carrier so that it can be changed, for any reason desired.

The invention has many valuable uses, a number of which are connected with aerial observation and/or aerial photography. By way of example only, a prototype of the invention has already proved useful in more accurately discerning the boundaries of an oil spill in a body of water, which boundaries were largely imperceptible without the aid of that device. It is believed that the device could also be used to help analyze the nature of vegetation in scenes viewed or photographed from the air and from a distance at which different types of vegetation might not be distinguishable from one another. The relative soil moisture content of different zones of an area of ground being observed might also be distinguishable with the aid of the present invention, as could soil disturbance. The device might also be helpful in meteorology in analyzing different types of clouds and the qualities of those clouds.

Not only does the invention help an observer to readily perceive polarization phenomena otherwise imperceptible (which occur in wavelengths which are per se humanly perceptible) but also permits, with the assistance of a camera, recordation and later analysis of degrees of polarization which are undetectable by the human senses (even with a filter) and/or occur in wave lengths beyond human visual perception (ultraviolet and near infrared).

Nevertheless, the apparatus needed to practice the invention is extremely simple and economical, particularly by way of comparison to a number of the aforementioned prior art devices which, despite their complexity, still do not provide the same type of real time scene perception potential.

BRIEF DESCRIPTION OF THE DRAWINGS

FIG. 1 is a cross-sectional view, with some parts being shown in elevation, of an embodiment of a polarization perception device according to the invention, taken longitudinally of the polarization filter and its rotary carrier.

FIG. 2 is a plan view taken on the line 2—2 of FIG. 1.

FIG. 3 is a plan view taken on the line 3—3 of FIG. 1.

FIG. 4 is a plan view of the horizontal portion of the holder taken on the line 4—4 of FIG. 1.

DETAILED DESCRIPTION

FIGS. 1–4 depict an exemplary embodiment of a polarization perception device according to the present invention. The device includes a base structure including a box-like portion 10 which lies generally horizontal in use, and a plate 12 upstanding from one end of the box-like portion 10. As best shown in FIG. 4, the box-like portion 10 is open through the bottom, having an integrally formed top 14 (see also FIG. 1), opposite long sides 16, and opposite short front 18 and rear 20 ends. The sides 16 each have front extensions 22 and rear extensions 24, so that the box-like portion 10 is generally H-shaped in plan, as shown in FIG. 4. The open bottom of the box-like portion 10 is closed by a closure plate 26 which forms part of the horizontal portion of the base structure. Plate 26 is removably secured to sides 16 as by screws, not shown. The plate 12 is secured between the rear extensions 24 by screws 28 and forms the vertical portion of the base structure.

Also connected to box-like portion 10 is a connector 30 for removably connecting the device to a camera 31 and positioning the device so that the filter, to be described below, will be aligned with the camera lens 33, and in front thereof. Connector 30 includes a horizontal base plate 32 elongated in the front to rear direction, and a front tab 34 which extends upwardly from the plate 32, fits between the front projections 22 of the box-like portion 10, and is secured therebetween by screws 36 (see FIG. 2). Support pads 38 project upwardly from opposite sides of plate 32 to abut plate 26 and thereby position the device in the proper vertical position with respect to camera lens 33. It can be appreciated that, if it is desired to use the device with a different camera from the one shown in phantom in at 31 FIG. 1, the connector 30 can be removed and replaced by another connector in which the pads 38 project upwardly to a greater or lesser extent, as needed to properly position the device with the second camera.

Most cameras are provided with a threaded hole in their underside which may be used, for example, to mount the camera on a tripod. The plate 32 extends rearwardly far enough so that, when the filter is properly aligned with the camera lens 33, the rear portion of plate 32 will underlie this hole 40. That portion of the plate 32 is provided with a front to rear slot 42, through which passes a screw 44 for connecting plate 32 to camera 31 via hole 40. The length of slot 42 allows for adjustment for proper positioning of the filter. With respect to different cameras, e.g. cameras in which the lens may project to a greater or lesser degree from the camera body. However, if even greater adjustment is needed, the connector 30 can be removed and replaced by one with a plate 32 of a different length.

The box-like portion 10 of the base structure contains a battery 46, and front wall 18 of the box-like portion mounts a conventional switch assembly 47, the portion thereof disposed within the box-like portion 10 being connected to battery 26 by suitable wires, and the external portion including an operating lever 48 accessible on the outside of end wall 18 above connector tab 34. Other wires 50 extend from the switch mechanism 47, through a hole in the top 14 of box-like portion 10, to a conventional electric motor 52 supported in a bracket upstanding from the top 14 of box-like portion 10. More specifically, the bracket includes a lower half 54 upstanding from the top 14 of the box-like portion 10, and a top half 56 releasably connected to the bottom half 54 by screws 58. The two halves 54 and 56 of the bracket have opposed arcuate surfaces sized to receive the motor 52 so that the motor 52 can be clamped between the two halves of the bracket when the screws 58 are engaged. Motor 52 has a rotary drive shaft 60 extending outwardly from one end and carrying a gear 62.

The lower part of plate 12 is sized to lie between rear extensions 24 of the box-like portion 10, as previously explained. It has an access opening 66, aligned with gear for and an opening 64 for like purposes if plate 12 is mounted on a different size device.

The upper part of the plate 12 is enlarged and has a large through opening 68 aligned with the camera lens 33. Three idler rollers 70 are rotatably mounted on the front of plate 12, symmetrically circumferentially spaced about opening 68, and projecting slightly radially thereinto. They may be so connected as by screws 72 and may have elastomeric rings 74 on their outer diameters for frictionally engaging in an external annular groove 76 in an annular carrier main body 78 which is thereby centered and supported in opening 68 by rollers 70.

Carrier 78 is counterbored from the rear to form a shoulder for seating the annular frame 80 which surrounds the polarizing filter 82. An annular retainer 84 abuts the back of frame 80 and is removably secured to carrier main body 78 by screws 86 so that the filter 82 can be removed and replaced. Retainer 84 may be formed in two approximately semi-annular pieces, as shown in FIG. 3. As shown in FIGS. 2 and 3, the carrier main body 78 has integrally formed thereon an annular position indicator 88 which projects radially into the otherwise unobstructed field of view of the filter. Alternatively, the position indicator could be formed on the frame 80 or the filter 82. Since the position indicator 88 is fixed with respect to the filter 82, it provides a reference for the position of the filter with respect to the scene being viewed and/or photographed.

The front of carrier main body 78 has a forwardly projecting rim 90 which forms a seat for an annular gear 92 secured thereto by screws 94. Gear 92 meshes with gear 62, so that it can be rotatably driven by motor 52.

The speed of the motor 52 is chosen so that it will continuously rotate the gear 92, and thus the carrier 78 and filter 82, about the centerline of the filter (which, as shown, is concentric with carrier 78 and its gear 92) at a speed slow enough to permit changes in light transmission by virtue of the angular movement of the filter to be perceived as light-dark pulses by a human observer, but fast enough so that the light phase of each such pulse occurs prior to fading of the light image of the preceding pulse from the observer's retina. In general, a speed between one revolution per five seconds and one revolution per 1/15th second, inclusive, will accomplish this for most observers. In a preferred embodiment, the drive means or motor is adapted to rotate the filter at a speed of approximately one rotation per second.

It can be appreciated that the device, instead of being mounted to a camera 31, could be used for direct human observation. However, because the motor speed is as described above, if the device is mounted to a camera such as 31, and a scene is filmed or videotaped, the same light-dark pulses which could have been observed by the human observer (or may still be observed by the human looking through the camera lens and filter) will appear on the resulting videotape or film. Indeed, differences in the light and dark phases caused by polarization of objects in a scene can even be recorded in a series of still shots.

Because one light phase does not fade from the observer's retina before the next such light phase occurs, whether viewing the scene directly or on film or tape, yet the dark phase is also perceptible for contrast, it becomes feasible for the human observer to actually perceive in real time (and/or delayed time) the locations, shapes and sizes of those objects in the scene which are polarizing light to a greater extent than other objects. This can allow the observer, for example, to precisely define the boundaries of an oil slick on a body of water which could not otherwise be determined with the naked eye or on a film or tape.

Although this device allows for many "on the spot" functions because of this ability to perceive in real and/or delayed time, e.g. an observer in a helicopter can direct by radio communications the emplacement of containment booms about an oil slick, the resulting tape or film can also be analyzed by digitization technology to provide a more precise record, e.g. in the form of a map, where that may be desired.

Numerous modifications to the exemplary embodiment described above may be made within the spirit of the invention. For example, many difference ways of forming the horizontal portion of the base structure and mounting the batteries and drive motor thereto may be devised. While the exemplary embodiment rotates the filter continuously, it might also be possible to utilize devices which oscillate the filter, e.g. first rotating the filter clockwise, and then counterclockwise. Accordingly, it is intended that the scope of the invention be limited only by the claims which follow.

What is claimed is:

1. A polarization perception device, comprising:

base structure;

a polarizing filter having opposite broad sides and a centerline perpendicular to the sides, the filter being mounted on the base structure for relative rotation with respect thereto and with a major portion of the area of the filter substantially unobstructed on either side;

automatic drive means carried by the base structure and operatively connected to the filter and adapted to move the filter angularly about its centerline at a speed slow enough to permit changes in light transmission by virtue of the angular movement of the filter to be perceived as light phase and dark phase pulses by a human observer, a light phase image being formed on the retina of the eye of the human observer, but fast enough so that the light phase of each such pulse occurs prior to fading of the light phase image of the preceding pulse from the observer's retina;

wherein the base structure has an upright portion having a through opening and mounting a plurality of idler rollers circumferentially spaced about the through opening;

a generally annular carrier concentrically receiving the filter, centered within the idler rollers and rotatably supported thereby in alignment with the through opening; and further comprising a first gear projecting radially outwardly from the carrier and a second gear meshing with the first gear and connected to the drive means for angular movement thereby.

2. The device of claim 1 wherein the base structure further comprises a horizontal portion, the drive means comprising an electric motor mounted on the horizontal portion;

the horizontal portion further defining a battery case and carrying wires for electrically connecting batteries in the case to the motor and a switch for selectively making and breaking said electrical connection.

3. The device of claim 2 further comprising a connector carried on the base structure and adapted to connect the base structure to a camera with the filter aligned with the camera lens.

4. The device of claim 1 wherein the filter is removably mounted in the carrier.

* * * * *